US010680240B2

(12) United States Patent
Oshitari et al.

(10) Patent No.: US 10,680,240 B2
(45) Date of Patent: Jun. 9, 2020

(54) ELECTRODE MATERIAL FOR LITHIUM ION BATTERY AND LITHIUM ION BATTERY

(71) Applicant: SUMITOMO OSAKA CEMENT CO., LTD., Tokyo (JP)

(72) Inventors: Satoru Oshitari, Chiba (JP); Masataka Oyama, Chiba (JP); Ryuuta Yamaya, Chiba (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/142,308

(22) Filed: Sep. 26, 2018

(65) Prior Publication Data

US 2019/0305304 A1 Oct. 3, 2019

(30) Foreign Application Priority Data

Mar. 30, 2018 (JP) ................................ 2018-068647

(51) Int. Cl.

| | |
|---|---|
| ***H01M 4/00*** | (2006.01) |
| ***H01M 4/36*** | (2006.01) |
| ***H01M 4/58*** | (2010.01) |
| ***H01M 4/587*** | (2010.01) |
| ***H01M 10/0525*** | (2010.01) |
| ***H01M 4/62*** | (2006.01) |
| *H01M 4/02* | (2006.01) |

(52) U.S. Cl.

CPC ........... *H01M 4/366* (2013.01); *H01M 4/587* (2013.01); *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search

CPC ..... H01M 10/056; H01M 4/38; H01M 2/0275
See application file for complete search history.

(56) References Cited

U.S. PATENT DOCUMENTS

| | | | | |
|---|---|---|---|---|
| 2010/0297496 | A1* | 11/2010 | Ravet ...................... | C01B 25/45 429/207 |
| 2011/0091772 | A1 | 4/2011 | Mishima et al. | |
| 2013/0309564 | A1* | 11/2013 | Yoshida ............ | H01M 10/0525 429/200 |
| 2016/0111712 | A1 | 4/2016 | Oyama et al. | |
| 2017/0279112 | A1 | 9/2017 | Yasumiishi et al. | |

FOREIGN PATENT DOCUMENTS

| | | | |
|---|---|---|---|
| CN | 107768727 | A | 3/2018 |
| CN | 101320809 | A | 12/2018 |
| JP | H10-144320 | A | 5/1998 |
| JP | 2000-223120 | A | 8/2000 |
| JP | 2005-520290 | A | 7/2005 |
| JP | 2006-032241 | A | 2/2006 |
| JP | 2009-117240 | A | 5/2009 |
| JP | 2013-080780 | A | 5/2013 |
| JP | 2013-542559 | A | 11/2013 |
| JP | 2014-170724 | A | 9/2014 |
| JP | 2014-232728 | A | 12/2014 |
| JP | 2016-081806 | A | 5/2016 |
| JP | 2017-069041 | A | 4/2017 |
| JP | 6288339 | B | 2/2018 |
| KR | 10-2011-0007112 | A | 1/2011 |
| KR | 20110076781 | A | 7/2011 |
| WO | 2011/013652 | A | 2/2011 |

OTHER PUBLICATIONS

Extended European Search Report for EP 18196569 dated Apr. 8, 2019.
Decision to Grand a Patent, Japanese Patent Office, Application No. 2018-068647, issued Dec. 25, 2018, with English translation.
Notice of Reasons for Refusal, Japanese Patent Office, Application No. 2018-068647, dated Oct. 30, 2018, with English translation.

* cited by examiner

*Primary Examiner* — Cynthia H Kelly
*Assistant Examiner* — Monique M Wills
(74) *Attorney, Agent, or Firm* — Greenblum & Bernstein, P.L.C.

(57) ABSTRACT

Embodiments provide an electrode material for a lithium ion battery capable of decreasing a metal elution amount even when an electrode active material having a large specific surface area is used as the electrode material and capable of obtaining a lithium ion battery in which a decrease in a capacity caused by storage at a high temperature in a fully charged state is suppressed and a lithium ion battery. The electrode material for a lithium ion battery includes electrode active material particles and a carbonaceous film that coats surfaces of the electrode active material particles, in which a tap density is 0.95 $g/cm^3$ or more and 1.6 $g/cm^3$ or less, and a volume ratio of micro pores to a total volume that is evaluated from nitrogen adsorption measurement is 1.5% or more and 2.5% or less.

4 Claims, No Drawings

ELECTRODE MATERIAL FOR LITHIUM ION BATTERY AND LITHIUM ION BATTERY

TECHNICAL FIELD

The present invention relates to an electrode material for a lithium ion battery and a lithium ion battery.

BACKGROUND ART

Lithium ion batteries have a higher energy density and a higher power density than lead batteries and nickel-hydrogen batteries and are used in a variety of uses such as small-sized electronic devices such as smartphones, domestic backup power supply, and electric tools. In addition, attempts are underway to put high-capacity lithium ion batteries into practical use for recyclable energy storage such as photovoltaic power generation and wind power generation.

Lithium ion batteries include a cathode, an anode, an electrolytic solution, and a separator. As an electrode material that constitutes the cathode, electrode active materials made of a lithium-containing metal oxide having properties capable of reversibly intercalating and deintercalating lithium ions such as lithium cobalt oxide ($LiCoO_2$), lithium manganese oxide ($LiMn_2O_4$), and lithium iron phosphate ($LiFePO_4$) are used, and studies are underway in order for improvement from a variety of viewpoints of an increase in the capacity of batteries, the extension of service lives, improvement of safety, cost reduction, and the like (for example, Patent Document 1).

RELATED ART DOCUMENT

Patent Document

[Patent Document 1] JP-A-10-144320

DISCLOSURE OF THE INVENTION

Problem that the Invention is to Solve

Meanwhile, lithium ion batteries including a cathode for which the above-described electrode active material is used have a problem of the capacity being significantly decreased due to high-temperature storage in a fully charged state. As one of causes therefor, the present inventors found the elution of a large amount of metal from the electrode active material. As a reason for the elution of a large amount of metal from the electrode active material, a large specific surface area of the electrode active material and a large contact area between the electrode active material and an electrolyte are exemplified. Metal eluted from the electrode active material is precipitated on an anode, and the capacity is consumed in order to generate a solid electrolyte interface (SEI) on a surface of the precipitate.

As one of solutions to the above-described problem, a decrease in the specific surface area of the electrode active material can be considered, but the electrode active material has a large electron resistance or ion diffusion resistance in solid, and thus, when the electrode active material has a low specific surface area and a large particle diameter, the capacity significantly decreases in an operation at a large current or a low temperature, which makes the electrode active material inappropriate to practical use. As another solution, the formation of a carbon coat that is used to impart a conductive property on a surface of the electrode active material in a thickness of approximately 1 to 5 nm can be considered. From the formation of the carbon coat, a decrease in the contact area between the electrode active material and the electrolyte is expected. However, in a case in which a carbon coat having a number of micro pores defined as a micropore diameter of 2 nm or less are formed on the surface of the electrode active material, it is not possible to decrease a metal elution amount. On the other hand, in a case in which a carbon coat having a small number of micro pores are formed on the surface of the electrode active material, the electrolyte is not capable of intruding into the carbon coat, and thus it is not possible to obtain an electrode active material having favorable battery characteristics.

The present invention has been made in consideration of the above-described circumstances, and an object of the present invention is to provide an electrode material for a lithium ion battery capable of decreasing a metal elution amount even when an electrode active material having a large specific surface area is used as the electrode material and capable of obtaining a lithium ion battery in which a decrease in a capacity caused by storage at a high temperature in a fully charged state is suppressed and a lithium ion battery.

Means for Solving the Problem

As a result of intensive studies for solving the above-described problem, the present inventors found that the problem can be solved by setting a tap density of an electrode material for a lithium ion battery and a volume ratio of micro pores to the total volume that is evaluated from nitrogen adsorption measurement in specific ranges respectively.

The present invention was completed on the basis of such a finding.

That is, the present invention provides [1] to [5].

[1] An electrode material for a lithium ion battery including electrode active material particles and a carbonaceous film that coats surfaces of the electrode active material particles, in which a tap density is 0.95 g/cm$^3$ or more and 1.6 g/cm$^3$ or less, and a volume ratio of micro pores to a total volume that is evaluated from nitrogen adsorption measurement is 1.5% or more and 2.5% or less.

[2] The electrode material for a lithium ion battery according to [1], in which the electrode active material particles are represented by General Formula $Li_{x1}A_{y1}D_{z1}PO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x1<1.1$, $0<y1\leq1$, $0\leq z1<1$, and $0.9<y1+z1<1.1$).

[3] The electrode material for a lithium ion battery according to [1] or [2], in which the electrode active material particles are represented by General Formula $LiFe_{x2}Mn_{1-x2-y2}M_{y2}PO_4$ (here, M represents at least one element selected from the group consisting of Mg, Ca, Co, Sr, Ba, Ti, Zn, B, Al, Ga, In, Si, Ge, Sc, and Y, $0.05\leq x2\leq1.0$, and $0\leq y\leq0.14$).

[4] The electrode material for a lithium ion battery according to any one of [1] to [3], in which a specific surface area of the electrode active material particles is 10 m$^2$/g or more and 28 m$^2$/g or less, and a content of carbon per unit specific surface area is 0.4 mg/m$^2$ or more and 2.0 mg/m$^2$ or less.

[5] A lithium ion battery including a cathode, an anode, and an electrolyte, in which the cathode has a cathode mixture layer formed using the electrode material according to any one of [1] to [4].

Advantage of the Invention

According to the present invention, it is possible to provide an electrode material for a lithium ion battery capable of decreasing a metal elution amount even when an electrode active material having a large specific surface area is used as the electrode material and capable of obtaining a lithium ion battery in which a decrease in a capacity caused by storage at a high temperature in a fully charged state is suppressed and a lithium ion battery.

BEST MODE FOR CARRYING OUT THE INVENTION

[Electrode Material for Lithium Ion Battery]

An electrode material for a lithium ion battery of the present embodiment (hereinafter, also simply referred to as the electrode material) is an electrode material including electrode active material particles and a carbonaceous film that coats surfaces of the electrode active material particles, in which a tap density is 0.95 $g/cm^3$ or more and 1.6 $g/cm^3$ or less, and a volume ratio of micro pores to a total volume that is evaluated from nitrogen adsorption measurement is 1.5% or more and 2.5% or less.

The electrode active material particles that are used in the present embodiment are not particularly limited, but a transition metal lithium phosphate compound having an olivine structure is preferred, from the viewpoint of a high discharge capacity and a high energy density, electrode active material particles represented by General Formula $Li_{x1}A_{y1}D_{z1}PO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x1<1.1$, $0<y1\leq 1$, $0\leq z1<1$, and $0.9<y1+z1<1.1$) are more preferred, and electrode active material particles represented by General Formula $LiFe_{x2}Mn_{1-x2-y2}N_{y2}PO_4$ (here, M represents at least one element selected from the group consisting of Mg, Ca, Co, Sr, Ba, Ti, Zn, B, Al, Ga, In, Si, Ge, Sc, and Y, $0.05\leq x2\leq 1.0$, and $0\leq y2\leq 0.14$) are more preferred.

Here, in General Formula $Li_{x1}A_{y1}D_{z1}PO_4$, A is preferably Co, Mn, Ni, and Fe and more preferably Co, Mn, and Fe. In addition, D is preferably Mg, Ca, Sr, Ba, Ti, Zn, and Al. In a case in which the electrode active material particles include these elements, it is possible to produce a cathode mixture layer capable of realizing a high discharge potential and high safety. In addition, these elements have an abundant amount of resources and are thus preferred as a material to be selected.

The electrode active material particles are constituted of primary particles and secondary particles that are aggregates of the primary particles. A shape of the electrode active material is not particularly limited, but is preferably spherical, particularly, truly spherical. When the electrode active material particle has a spherical shape, it is possible to decrease an amount of a solvent in preparation of a paste for forming an electrode using the electrode material of the present embodiment, and application of the paste for forming an electrode to a current collector becomes easy. Meanwhile, the paste for forming an electrode can be prepared by, for example, mixing the electrode material of the present embodiment, a binder resin (a binding agent), and a solvent.

The specific surface area of the electrode active material particles is preferably 10 $m^2/g$ or more, more preferably 12 $m^2/g$ or more, and still more preferably 14 $m^2/g$ or more, and the specific surface area is preferably 28 $m^2/g$ or less, more preferably 27 $m^2/g$ or less, and still more preferably 26 $m^2/g$ or less. When the specific surface area is 10 $m^2/g$ or more, the particle diameters of central particles of the electrode active material are small, and it is possible to increase the capacity during operation at a high current or at a low temperature by shortening a time taken for lithium ions and electrons to migrate. Meanwhile, when the specific surface area is 28 $m^2/g$ or less, it is possible to suppress an increase in the elution of metal caused by an increase in the specific surface area of the electrode active material.

Meanwhile, the specific surface area can be measured using a specific surface meter (for example, manufactured by Mountech Co., Ltd., product No.: Macsorb HM MODEL 1208).

A content of carbon per unit specific surface area of the electrode active material particles is preferably 0.4 $mg/m^2$ or more, more preferably 0.5 $mg/m^2$ or more, and still more preferably 0.6 $mg/m^2$ or more, and the content of carbon is preferably 2.0 $mg/m^2$ or less, more preferably 1.9 $mg/m^2$ or less, and still more preferably 1.8 $mg/m^2$ or less. When the content of carbon per unit specific surface area is 0.4 $mg/m^2$ or more, the carbonaceous film is capable of exhibiting a sufficient electron conductivity. Meanwhile, when the content of carbon per unit specific surface area is 2.0 $mg/m^2$ or less, an amount of fine crystals of graphite made of a lamellar structure in the carbonaceous film is small, and thus a steric barrier caused by the fine crystals of graphite is not generated during the diffusion of lithium ions in the carbonaceous film. Therefore, it is possible to suppress an increase in a lithium ion migration resistance.

Meanwhile, the content of carbon per unit specific surface area of the electrode active material particles can be calculated by dividing the content of carbon measured using a carbon analyzer (manufactured by Horiba Ltd., product No.: EMIA-220V) by the above-described specific surface area.

The carbonaceous film that coats the primary particles of the electrode active material and the secondary particles that are aggregates of the primary particles is pyrolytic carbon obtained by carbonizing an organic substance that serves as a raw material of the carbonaceous film. The organic substance is not particularly limited as long as the organic substance is capable of forming the carbonaceous film on surfaces of the electrode active material particles, and examples thereof include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, phenol, phenolic resins, glucose, fructose, galactose, mannose, maltose, sucrose, lactose, glycogen, pectin, alginic acid, glucomannan, chitin, hyaluronic acid, chondroitin, agarose, polyethers, polyvalent alcohols, and the like. Examples of the polyvalent alcohols include polyethylene glycol, polypropylene glycol, polyglycerin, glycerin, and the like. These organic substances may be used singly or two or more organic substances may be used in mixture.

An average particle diameter of the primary particles of the electrode active material particles coated with the carbonaceous film (hereinafter, also referred to as "the carbonaceous coated electrode active material particles") is preferably 50 nm or more, more preferably 70 nm or more, and still more preferably 100 nm or more, and the average particle diameter is preferably 500 nm or less, more preferably 450 nm or less, and still more preferably 400 nm or less. When the average particle diameter of the primary particles is 50 nm or more, it is possible to suppress an increase in the amount of carbon attributed to an increase in the specific surface area of the electrode material, and thus it is possible to suppress a decrease in a charge and discharge capacity of a lithium ion battery. Meanwhile, when the average particle diameter of the primary particles is 500 nm or less, it is possible to shorten a migration time taken of lithium ions or a migration time of electrons that migrate in the electrode material. Therefore, it is possible to suppress deterioration of output characteristics attributed to an increase in an internal resistance of the lithium ion battery.

Here, the average particle diameter of the primary particles refers to the number-average particle diameter. The average primary particle diameter of the primary particles can be obtained by number-averaging the particle diameters of randomly-selected 200 or more particles measured using a scanning electron microscope (SEM).

An average particle diameter of the secondary particles of the carbonaceous coated electrode active material particles is preferably 0.5 μm or more, more preferably 1.0 μm or more, and still more preferably 1.5 μm or more, and the average particle diameter is preferably 20 μm or less, more preferably 18 μm or less, and still more preferably 15 μm or less. When the average particle diameter of the secondary particles is 0.5 μm or more, it is possible to suppress an increase in a necessary amount of a conductive auxiliary agent and the binding agent to prepare an electrode material paste for a lithium ion battery by mixing the electrode material, the conductive auxiliary agent, the binder resin (the binding agent). Therefore, it is possible to increase a battery capacity of the lithium ion battery per unit mass in the cathode mixture layer of the cathode of the lithium ion battery. Meanwhile, when the average particle diameter of the secondary particles is 20 μm or less, it is possible to enhance the dispersibility and uniformity of the conductive auxiliary agent or the binding agent in the cathode mixture layer of the cathode of the lithium ion battery. As a result, a discharge capacity in the high-speed charge and discharge of the lithium ion battery increases.

Here, the average particle diameter of the secondary particles refers to a volume-average particle diameter. The average particle diameter of the secondary particles can be measured using a laser diffraction and scattering particle size distribution measurement instrument or the like.

A content of carbon included in the carbonaceous coated electrode active material particles is preferably 0.8% by mass or more, more preferably 1.2% by mass or more, and still more preferably 2.0% by mass or more and the content of carbon is preferably 4.0% by mass or less and more preferably 3.8% by mass or less. When the content of carbon is 0.8% by mass or more, the discharge capacity at a high charge-discharge rate increases in a case in which the lithium ion battery is formed, and it becomes possible to realize a sufficient charge and discharge rate performance. Meanwhile, when the content of carbon is 4.0% by mass or less, it is possible to suppress a decrease in the battery capacity per unit mass caused by an increase in the content of carbon in the electrode active material.

Meanwhile, the content of carbon can be measured using a carbon analyzer (manufactured by Horiba Ltd., product No.: EMIA-220V).

A thickness (average value) of the carbonaceous film that coats the electrode active material particles is preferably 1.0 nm or more and more preferably 1.4 nm or more, and the thickness of the carbonaceous film is preferably 10.0 nm or less and more preferably 7.0 nm or less. When the thickness of the carbonaceous film is 1.0 nm or more, it is possible to suppress an increase in a sum of migration resistances of electrons in the carbonaceous film. Therefore, it is possible to suppress an increase in the internal resistance of the lithium ion secondary battery, and it is possible to prevent voltage drop at a high charge-discharge rate. Meanwhile, when the thickness of the carbonaceous film is 10.0 nm or less, it is possible to suppress the formation of a steric barrier that inhibits the diffusion of lithium ions in the carbonaceous film, and thus a migration resistance of lithium ions decreases. As a result, an increase in the internal resistance of the battery is suppressed, and it is possible to prevent voltage drop at a high charge-discharge rate.

A coating ratio of the carbonaceous film to the electrode active material particles is preferably 60% or more and more preferably 80% or more. When the coating ratio of the carbonaceous film is 60% or more, a coating effect of the carbonaceous film can be sufficiently obtained.

Meanwhile, the coating ratio of the carbonaceous film can be measured by observing the particles using a transmission electron microscope (TEM), an energy dispersive X-ray microanalyzer (EDX), or the like, calculating a proportion of a part covering particle surfaces, and obtaining an average value thereof.

A density of the carbonaceous film, which is calculated using a carbon component constituting the carbonaceous film, is preferably 0.3 $g/cm^3$ or more and more preferably 0.4 $g/cm^3$ or more and the density is preferably 2.0 $g/cm^3$ or less and more preferably 1.8 $g/cm^3$ or less. The density of the carbonaceous film, which is calculated using the carbon component constituting the carbonaceous film, refers to a mass of the carbonaceous film per unit volume in a case in which the carbonaceous film is constituted of carbon alone.

When the density of the carbonaceous film is 0.3 $g/cm^3$ or more, the carbonaceous film is capable of exhibiting a sufficient electron conductivity. Meanwhile, when the density of the carbonaceous film is 2.0 $g/cm^3$ or less, an amount of fine crystals of graphite made of a lamellar structure in the carbonaceous film is small, and thus a steric barrier caused by the fine crystals of graphite is not generated during the diffusion of lithium ions in the carbonaceous film. Therefore, there are no cases in which lithium ion migration resistance increases. As a result, there are no cases in which the internal resistance of the lithium ion battery increases, and voltage drop does not occur at a high charge-discharge rate of the lithium ion battery.

The tap density of the electrode material for a lithium ion battery of the present embodiment is 0.95 $g/cm^3$ or more and 1.6 $g/cm^3$ or less. When the tap density is less than 0.95 $g/cm^3$, a contact area between the electrode active material and an electrolyte excessively increases, a metal elution amount from the electrode active material increases, and there is a concern that a decrease in the capacity of the lithium ion battery to be obtained caused by high-temperature storage in a fully charged state may become significant. Meanwhile, when the tap density exceeds 1.6 $g/cm^3$, the contact area between the electrode active material and an electrolyte excessively decreases, and the intercalation and deintercalation of lithium ions into and from the electrode active material become difficult, and thus there is a concern that a decrease in the capacity may become large. From the above-described viewpoint, the tap density is preferably 1.0 $g/cm^3$ or more and more preferably 1.2 $g/cm^3$ or more, and the tap density is preferably 1.5 $g/cm^3$ or less and more preferably 1.4 $g/cm^3$ or less.

Meanwhile, the tap density can be measured using a method according to test methods for bulk density of fine ceramic powder of JIS R 1628:1997.

The volume ratio of micro pores to the total volume that is evaluated from nitrogen adsorption measurement of the electrode material for a lithium ion battery of the present embodiment is 1.5% or more and 2.5% or less. When the volume ratio of micro pores to the total volume is less than 1.5%, the intrusion of the electrolyte into the carbonaceous coated electrode active material particles is difficult, and there is a concern that favorable battery characteristics cannot be obtained. Meanwhile, when the volume ratio exceeds 2.5%, the contact area between the electrode active material and the electrolyte excessively increases, the metal elution amount from the electrode active material increases, and there is a concern that a decrease in the capacity of the lithium ion battery to be obtained caused by high-temperature storage in a fully charged state may become significant. From the above-described viewpoint, the volume ratio of micro pores to the total volume is preferably 1.6% or more, more preferably 1.7% or more, and still more preferably 1.9% or more, and the volume ratio is preferably 2.4% or less and more preferably 2.3% or less.

Meanwhile, the volume ratio of micro pores to the total volume can be measured using a method described in examples and calculated.

(Method for Manufacturing Electrode Material for Lithium Ion Battery)

A method for manufacturing an electrode material for a lithium ion battery of the present embodiment is not particularly limited, but has, for example, (A) a step of obtaining electrode active material particles, (B) a step of preparing a mixture by adding an organic compound to the electrode active material particles obtained in the step (A), and (C) a step of putting the mixture into a calcination capsule and calcinating the mixture.

[Step (A)]

In Step (A), a method for manufacturing the electrode active material particles is not particularly limited, and, for example, in a case in which the electrode active material particles are represented by $Li_{x1}A_{y1}D_{z1}PO_4$, it is possible to use a method of the related art such as a solid phase method, a liquid phase method, or a gas phase method. Examples of $Li_{x1}A_{y1}D_{z1}PO_4$ obtained using the above-described method include particle-like $Li_{x1}A_{y1}D_{z1}PO_4$ (hereinafter, referred to as "$Li_{x1}A_{y1}D_{z1}PO_4$ particles" in some cases).

$Li_{x1}A_{y1}D_{z1}PO_4$ particles can be obtained by, for example, hydrothermally synthesizing a slurry-form mixture obtained by mixing a Li source, an A source, a P source, water, and, as necessary, a D source. According to the hydrothermal synthesis, $Li_{x1}A_{y1}D_{z1}PO_4$ is generated as a sediment in water. The obtained sediment may be a precursor of $Li_{x1}A_{y1}D_{z1}PO_4$. In this case, the target $Li_{x1}A_{y1}D_{z1}PO_4$ particles can be obtained by calcinating the precursor of $Li_{x1}A_{y1}D_{z1}PO_4$.

A pressure-resistant airtight container is preferably used in the hydrothermal synthesis.

As reaction conditions of the hydrothermal synthesis, for example, the heating temperature is preferably 110° C. or higher and 200° C. or lower, more preferably 115° C. or higher and 195° C. or lower, and still more preferably 120° C. or higher and 190° C. or lower. When the heating temperature is set in the above-described range, it is possible to set the specific surface area of the electrode active material particles in the above-described range. In addition, the reaction time is preferably 20 minutes or longer and 169 hours or shorter, more preferably 30 minutes or longer and 24 hours or shorter, and still more preferably one hour or longer and 10 hours or shorter. Furthermore, the pressure during the reaction is preferably 0.1 MPa or more and 22 MPa or less and more preferably 0.1 MPa or more and 17 MPa or less.

A molar ratio (Li:A:D:P) among the Li source, the A source, the D source, and the P source is preferably 2.5 to 4.0:0 to 1.0:0 to 1.0:0.9 to 1.15 and more preferably 2.8 to 3.5:0 to 1.0:0 to 1.0:0.95 to 1.1.

Here, as the Li source, for example, at least one selected from the group consisting of hydroxides such as lithium hydroxide (LiOH); inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$); organic lithium acid salts such as lithium acetate ($LiCH_3COO$) and lithium oxalate ($(COOLi)_2$), and hydrates thereof is preferably used. Meanwhile, lithium phosphate ($Li_3PO_4$) can be used as the Li source and the P source.

Examples of the A source include chlorides, carboxylates, hydrosulfates, and the like which include at least one selected from the group consisting of Co, Mn, Ni, Fe, Cu, and Cr. For example, in a case in which the A in $Li_{x1}A_{y1}D_{z1}PO_4$ is Fe, examples of the Fe source include iron compounds such as iron (II) chloride ($FeCl_2$), iron(II) sulfate ($FeSO_4$), and iron (II) acetate ($Fe(CH_3COO)_2$) and hydrates thereof, trivalent iron compounds such as iron (III) nitrate ($Fe(NO_3)_3$), iron(III) chloride ($FeCl_3$), and iron (III) citrate ($FeC_6H_5O_7$), lithium iron phosphate, and the like.

Examples of the D source include chlorides, carboxylates, hydrosulfates, and the like which include at least one selected from the group consisting of Mg, Ca, Sr, Ba, Ti, Zn, B, Al, Ga, In, Si, Ge, Sc, and Y. For example, in a case in which the D in $Li_{x1}A_{y1}D_{z1}PO_4$ is ca, examples of the Ca source include calcium (II) hydroxide ($Ca(OH)_2$), calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), hydrates thereof, and the like.

Examples of the P source include phosphoric acid compounds such as phosphoric acid ($H_3PO_4$), ammonium dihydrogen phosphate ($NH_4H_2PO_4$), and diammonium phosphate ($(NH_4)_2HPO_4$). Among these, as the P source, at least one selected from the group consisting of phosphoric acid, ammonium dihydrogen phosphate, and diammonium phosphate is preferably used.

[Step (B)]

In Step (B), an organic compound is added to the electrode active material particles obtained in Step (A), thereby preparing a mixture.

First, the organic compound is added to the electrode active material particles, and then a solvent is added thereto.

An amount of the organic compound blended into the electrode active material particles is preferably 0.15 parts by mass or more and 15 parts by mass or less and more preferably 0.45 parts by mass or more and 4.5 parts by mass or less with respect to 100 parts by mass of the electrode active material particles when the total mass of the organic compound is converted to a carbon element.

When the amount of the organic compound blended to the electrode active material particles is 0.15 parts by mass or more, it is possible to set a coating ratio of a carbonaceous film that is generated by a thermal treatment of the organic compound to the surfaces of the electrode active material particles to 80% or more. Therefore, it is possible to increase the discharge capacity of the lithium ion battery at a high charge-discharge rate, and a sufficient charge and discharge rate performance can be realized. Meanwhile, when the amount of the organic compound blended to the electrode active material particles is 15 parts by mass or less, it is possible to suppress a decrease in the capacity of the lithium ion battery cause by a relative decrease in the blending ratio of the electrode active material particles. In addition, when the amount of the organic compound blended to the electrode active material particles is 15 parts by mass or less, it is possible to suppress an increase in a bulk density of the electrode active material particles caused by an excessive support of the electrode active material particles with respect to the electrode active material particles. Meanwhile, when the bulk density of the electrode active material particles increases, an electrode density decreases, and the battery capacity of the lithium ion battery per unit volume decreases.

As the organic compound that is used to prepare the mixture, the above-described compounds can be used.

Here, when a low-molecular-weight organic compound such as sucrose or lactose is used as the organic compound, it becomes easy to evenly form the carbonaceous film on the surfaces of the primary particles of the electrode material, but there is a tendency that a degree of carbonization of a carbonaceous film obtained by thermal decomposition decreases, and the formation of a carbonaceous film capable of achieving a sufficient decrease in resistance is difficult. In addition, the use of the above-described low-molecular-weight organic compound increases an amount of micro pores in the carbonaceous film and increases a ratio of the micro pores to all pores. On the other hand, when a high-molecular-weight organic compound such as polyvinyl alcohol or polyvinyl pyrrolidone or an organic compound having a benzene ring structure such as a phenolic resin is used, there is a tendency that the degree of carbonization of the carbonaceous film obtained by thermal decomposition increases, and a sufficient decrease in resistance can be achieved, but there is a tendency that it becomes difficult to evenly form the carbonaceous film on the surface of the primary particles of the electrode material, and there is a problem in that the achievement of a sufficient decrease in the resistance of the electrode material is difficult. In addition, the use of the above-described organic compound of a polymer or the organic compound having a benzene ring structure decreases an amount of micro pores in the carbonaceous film and decreases the ratio of the micro pores to all of the pores. Therefore, it is preferable to use an appropriate mixture of the low-molecular-weight organic compound and the high-molecular-weight organic compound or the organic compound having a benzene ring structure.

Particularly, a powder-form low-molecular-weight organic compound is preferably used since the electrode active material particles and the organic compound are easily mixed together, and it is possible to obtain an electrode material in which the carbonaceous film is evenly formed on the surfaces of the primary particles of the electrode active material particles. In addition, unlike the high-molecular-weight compound, the low-molecular-weight organic compound is easily dissolved in a solution, and no prior dissolution operation is required, and thus it is possible to decrease the number of operation steps or reduce costs taken for the dissolution operation.

When the solvent is added to the electrode active material particles, adjustment is carried out so that a solid content thereof preferably reaches 10 to 60% by mass, more preferably reaches 15 to 55% by mass, and still more preferably reaches 25 to 50% by mass. When the solid content is set in the above-described range, it is possible to set the tap density of an electrode material to be obtained in the above-described range.

Examples of the solvent include water; alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethyl formamide, N,N-dimethylacetoacetamide, and N-methyl pyrrolidone; glycols such as ethylene glycol, diethylene glycol, and propylene glycol, and the like. These solvents may be used singly or in a mixture form of two or more solvents. Among these solvents, a preferred solvent is water.

Meanwhile, a dispersant may be added thereto as necessary.

A method for dispersing the electrode active material particles and the organic compound in the solvent is not particularly limited as long as the electrode active material particles are uniformly dispersed and the organic compound is dissolved or dispersed. Examples of a device used for the above-described dispersion include medium stirring-type dispersion devices that stir medium particles at a high rate such as a planetary ball mill, an oscillation ball mill, a bead mill, a paint shaker, and an attritor.

Granulated bodies of the mixture may be generated by spraying the mixture using a spray-pyrolysis method in a high-temperature atmosphere, for example, in the atmosphere at 110° C. or higher and 200° C. or lower and drying the slurry. In the spray-pyrolysis method, in order to generate substantially spherical granulated bodies by rapidly drying the raw material slurry, the particle diameter of a liquid droplet during the spraying is preferably 0.01 μm or more and 100 μm or less.

[Step (C)]

In Step (C), the mixture obtained in Step (B) is put into a calcination capsule and is calcinated.

As the calcination capsule, for example, a calcination capsule made of a substance having excellent thermal conductivity such as carbon is preferably used.

The calcination temperature is preferably 630° C. or higher and 790° C. or lower and more preferably 680° C. or higher and 770° C. or lower.

When the calcination temperature is 630° C. or higher, the decomposition and reaction of the organic compound sufficiently progresses, and it is possible to sufficiently carbonize the organic compound. As a result, it is possible to form a low-resistance carbonaceous film on the obtained electrode material. Meanwhile, when the calcination temperature is 790° C. or lower, the grain growth in the electrode material does not proceed, and it is possible to maintain a sufficiently large specific surface area. As a result, the discharge capacity at a high charge-discharge rate increases in a case in which lithium ion batteries are formed, and it is possible to realize sufficient charge and discharge rate performance. The calcination time is not particularly limited as long as the organic compound is sufficiently carbonized and is, for example, 0.1 hours or longer and 100 hours or shorter. The calcination atmosphere is preferably an inert atmosphere filled with an inert gas such as nitrogen ($N_2$) or argon (Ar) or a reducing atmosphere including a reducing gas such as hydrogen ($H_2$). In a case in which it is necessary to further suppress the oxidation of the mixture, the calcination atmosphere is more preferably a reducing atmosphere.

The organic compound is decomposed and reacted by the calcination in Step (C), and thus carbon is generated. In addition, this carbon is attached to the surfaces of the electrode active material particles, thereby producing a carbonaceous film. Therefore, the surfaces of the electrode active material particles are coated with the carbonaceous film.

In the present embodiment, in Step (C), it is preferable to add a thermal conduction auxiliary substance having a higher thermal conductivity than the electrode active material particles to the mixture and then calcinate the mixture. In such a case, it is possible to make the temperature distribution in the calcination capsule during the calcinations more uniform. As a result, it is possible to suppress the generation of portions in which the carbonization of the organic compound is insufficient due to temperature unevenness in the calcination capsule or the generation of portions in which the electrode active material particles are reduced by carbon.

The thermal conduction auxiliary substance is not particularly limited as long as the thermal conduction auxiliary substance has a higher thermal conductivity than the electrode active material particles, but is preferably a substance that does not easily react with the electrode active material particles. This is because, when the thermal conduction auxiliary substance reacts with the electrode active material particles, there is a concern that the battery activity of the electrode active material particles to be obtained after the calcination may be impaired or there is a concern that it may become impossible to collect and reuse the thermal conduction auxiliary substance after the calcination.

Examples of the thermal conduction auxiliary substance include carbonaceous materials, alumina-based ceramic, magnesia-based ceramic, zirconia-based ceramic, silica-based ceramic, calcia-based ceramic, aluminum nitride, and the like. These thermal conduction auxiliary substances may be used singly or a mixture of two or more thermal conduction auxiliary substances may be used.

The thermal conduction auxiliary substance is preferably a carbonaceous material, and examples of the carbonaceous material that can be used as a thermal conduction auxiliary agent include graphite, acetylene black (AB), vapor-grown carbon fiber (VGCF), carbon nanotube (CNT), graphene, and the like. These thermal conduction auxiliary substances may be used singly or a mixture of two or more thermal conduction auxiliary substances may be used. Among these carbonaceous materials, graphite is more preferred as the thermal conduction auxiliary substance.

The dimensions of the thermal conduction auxiliary substance are not particularly limited. However, the average of the length of the thermal conduction auxiliary substance in the longitudinal direction is preferably 1 mm or more and 100 mm or less and more preferably 5 mm or more and 30 mm or less from the viewpoint of the thermal conduction efficiency since it is possible to make the temperature distribution in the calcination capsule sufficiently uniform and the amount of the thermal conduction auxiliary substance added is decreased. In addition, when the average of the length of the thermal conduction auxiliary substance in the longitudinal direction is 1 mm or more and 100 mm or less, it becomes easy to separate the thermal conduction auxiliary substance from the electrode material using a sieve.

In addition, the thermal conduction auxiliary substance preferably has a greater specific weight than the electrode material since separation using an air flow-type classifier or the like is easy.

The amount of the thermal conduction auxiliary substance added is also affected by the dimensions of the thermal conduction auxiliary substance; however, in a case in which the content of the mixture is set to 100% by volume, the amount of the thermal conduction auxiliary substance added is preferably 1% by volume or more and 50% by volume or less and more preferably 5% by volume or more and 30% by volume or less. When the amount of the thermal conduction auxiliary substance added is 1% by volume or more, it is possible to make the temperature distribution in the calcination capsule sufficiently uniform. Meanwhile, when the amount of the thermal conduction auxiliary substance added is 50% by volume or less, it is possible to suppress a decrease in the amount of the electrode active material particles and the organic compound being calcinated in the calcination capsule.

After the calcination, it is preferable to pass the mixture of the thermal conduction auxiliary substance and the electrode material through a sieve or the like and separate the thermal conduction auxiliary substance and the electrode material.

[Lithium Ion Battery]

A lithium ion battery of the present embodiment is a lithium ion battery having a cathode, an anode, and an electrolyte, in which the cathode has a cathode mixture layer formed using the electrode material.

[Cathode]

In order to produce the cathode, the electrode material (cathode material), a binding agent made of a binder resin, and a solvent are mixed together, thereby preparing a paint for forming the cathode or a paste for forming the cathode. At this time, a conductive auxiliary agent such as carbon black, acetylene black, graphite, ketjen black, natural graphite, or artificial graphite may be added thereto as necessary.

As the binding agent, that is, the binder resin, for example, a polytetrafluoroethylene (PTFE) resin, a polyvinylidene fluoride (PVdF) resin, fluorine rubber, or the like is preferably used.

A blending ratio between the cathode material and the binder resin is not particularly limited; however, for example, a content of the binder resin is set to 1 part by mass to 30 parts by mass and preferably set to 3 parts by mass to 20 parts by mass with respect to 100 parts by mass of the cathode material.

The solvent that is used for the paint for forming the cathode or the paste for forming the cathode may be appropriately selected in accordance with properties of the binder resin.

Examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methylpyrrolidone, glycols such as ethylene glycol, diethylene glycol, and propylene glycol, and the like. These solvents may be used singly, or two or more solvents may be used in mixture.

Next, the paint for forming the cathode or the paste for forming the cathode is applied onto one surface of an aluminum foil and then dried, thereby obtaining an aluminum foil having a coated film made of a mixture of the cathode material and the binder resin formed on one surface.

Next, the coated film is bonded by pressurization and dried, thereby producing a current collector (cathode) having a cathode mixture layer on one surface of the aluminum foil.

A cathode in which the metal elution amount from the electrode active material is decreased and a decrease of the capacity caused by high-temperature storage in a fully charged state can be produced in the above-described manner.

[Anode]

Examples of the anode include anodes including a carbon material such as metallic Li, natural graphite, or hard carbon or an anode material such as a Li alloy, $Li_4Ti_5O_{12}$, or $Si(Li_{4.4}Si)$.

[Electrolyte]

The electrolyte is not particularly limited, but is preferably a non-aqueous electrolyte, and examples thereof include electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

[Separator]

The cathode and the anode of the present embodiment can be made to face each other through a separator. As the separator, it is possible to use, for example, porous propylene.

In addition, instead of the non-aqueous electrolyte and the separator, a solid electrolyte may be used.

In the lithium ion battery of the present embodiment, the cathode has a cathode mixture layer formed using the electrode material for a lithium ion battery of the present embodiment, and thus the migration of Li ions is excellent all around battery-constituting members, it is possible to decrease a metal elution amount from the electrode active material, and it is possible to suppress a decrease in the capacity caused by the storage of the lithium ion battery at a high temperature in a fully charged state. Therefore, the lithium ion battery is preferably used in batteries for driving electric vehicles, batteries for driving hybrid vehicle, and the like.

EXAMPLES

Hereinafter, the present invention will be specifically described using examples and comparative examples. Meanwhile, the present invention is not limited to forms described in the examples.

Example 1

[Synthesis of Electrode Material for Lithium Ion Battery]

As a Li source and a P source, $Li_3PO_4$, as a Fe source, a $FeSO_4$ aqueous solution, as a Mn source, a $MnSO_4$ aqueous solution, as a Mg source, a $MgSO_4$ aqueous solution, as a Co source, a $CoSO_4$ aqueous solution, and, as a Ca source, a $Ca(OH)_2$ aqueous solution were used, these were mixed so that the molar ratio (Li:Fe:Mn:Mg:Co:Ca:P) reached 3:0.2448:0.70:0.05:0.0002:0.005:1 to prepare 1,000 L of a raw material slurry, and the raw material slurry was put into a pressure resistant vessel. After that, the raw material slurry was heated and reacted at 145° C. for 2.5 hours. After this reaction, the raw material slurry was cooled to reach room temperature (25° C.), thereby obtaining a sedimented reaction product in a cake state. In addition, this sediment was sufficiently cleaned with distilled water a plurality of times, thereby obtaining a cake-form electrode active material.

Next, as organic compounds which served as raw materials of a carbonaceous film, 371.8 g of a polyvinyl alcohol aqueous solution, 59.4 g of sucrose powder, and 135.8 g of a phenolic resin solution, the solid content of which had been adjusted to 20% in advance, were dispersed in 5 kg (in terms of the solid content) of the electrode active material by carrying out a dispersion treatment for two hours in a bead mill using zirconia balls having a diameter of 1 mm as medium particles, thereby preparing a homogeneous slurry. After that, water was added to the slurry so that a solid content of the slurry reached 40% by mass.

Next, this slurry was sprayed in the atmosphere at 150° C. and dried, thereby obtaining granulated bodies of the electrode active material which had an average particle diameter of 9 μm and were coated with an organic substance.

A graphite sintered body having an average length in the longitudinal direction of 10 mm was added as a thermal conduction auxiliary substance to the granulated bodies so that the content thereof reached 5% by volume with respect to 100% by volume of the obtained granulated bodies, and the components were mixed together, thereby obtaining a calcination raw material. 2.5 kg of this calcination raw material was laid in a 10 L graphite capsule, was calcinated for 2.5 hours at 700° C. in a non-oxidative gas atmosphere, and was then retained at 40° C. for 30 minutes, thereby obtaining a calcinated substance. This calcinated substance was passed through a $\phi$75 μm sieve, and the graphite sintered body was removed, thereby obtaining an electrode material for a lithium ion battery of Example 1.

[Production of Lithium Ion Battery]

The obtained electrode material for a lithium ion battery, polyvinylidene fluoride (PVdF) as a binder, and acetylene black (AB) as a conductive auxiliary agent were mixed together so that the mass ratio therebetween reached 90:5:5, and furthermore, N-methyl-2-pyrrolidone (NMP) was added thereto as a solvent so as to impart fluidity, thereby producing a slurry.

Next, this slurry was applied and dried on a 30 μm-thick aluminum (Al) foil (current collector). After that, the product was pressed using a roll calender machine at a total applied pressure of 5 t/250 mm, thereby producing a cathode.

Lithium metal was disposed as an anode with respect to the above-obtained cathode for a lithium ion battery, and a separator made of porous polypropylene was disposed between the cathode and the anode, thereby producing a member for a battery.

Meanwhile, ethylene carbonate and diethyl carbonate were mixed together in a mass ratio of 1:1, and furthermore, 1 M of a $LiPF_6$ solution was added thereto, thereby producing an electrolytic solution having lithium ion conductivity.

Next, the member for a battery was immersed in the electrolytic solution, thereby producing a lithium ion battery of Example 1.

Example 2

An electrode material for a lithium ion battery of Example 2 was obtained in the same manner as in Example 1 except for the fact that the amount of the sucrose powder added was set to 29.7 g, and the amount of the phenolic resin solution added was set to 203.4 g.

In addition, a lithium ion battery of Example 2 was obtained in the same manner as in Example 1 except for the fact that the electrode material for a lithium ion battery of Example 2 was used.

Example 3

An electrode material for a lithium ion battery of Example 3 was obtained in the same manner as in Example 1 except for the fact that the amount of the sucrose powder added was set to 103.4 g, and the amount of the phenolic resin solution added was set to 101.7 g.

In addition, a lithium ion battery of Example 3 was obtained in the same manner as in Example 1 except for the fact that the electrode material for a lithium ion battery of Example 3 was used.

Example 4

An electrode material for a lithium ion battery of Example 4 was obtained in the same manner as in Example 1 except for the fact that the amount of the sucrose powder added was set to 89.1 g, and the amount of the phenolic resin solution added was set to 167.8 g.

In addition, a lithium ion battery of Example 4 was obtained in the same manner as in Example 1 except for the fact that the electrode material for a lithium ion battery of Example 4 was used.

Example 5

An electrode material for a lithium ion battery of Example 5 was obtained in the same manner as in Example 1 except for the fact that the raw material slurry was produced and put into the pressure resistant vessel, and then the reaction temperature was changed to 170° C.

In addition, a lithium ion battery of Example 5 was obtained in the same manner as in Example 1 except for the fact that the electrode material for a lithium ion battery of Example 5 was used.

Example 6

An electrode material for a lithium ion battery of Example 6 was obtained in the same manner as in Example 1 except for the fact that the raw material slurry was produced and put into the pressure resistant vessel, and then the reaction temperature was changed to 120° C.

In addition, a lithium ion battery of Example 6 was obtained in the same manner as in Example 1 except for the fact that the electrode material for a lithium ion battery of Example 6 was used.

Example 7

An electrode material for a lithium ion battery of Example 7 was obtained in the same manner as in Example 1 except for the fact that, as organic compounds which served as raw materials of a carbonaceous film, 185.9 g of a polyvinyl alcohol aqueous solution, 29.7 g of sucrose powder, and 67.8 g of a phenolic resin solution, the solid content of which had been adjusted to 20% in advance, were dispersed in 5 kg (in terms of the solid content) of the electrode active material by carrying out a dispersion treatment for two hours in a bead mill using zirconia balls having a diameter of 1 mm as medium particles, thereby preparing a homogeneous slurry, thereby preparing a homogeneous slurry.

In addition, a lithium ion battery of Example 7 was obtained in the same manner as in Example 1 except for the fact that the electrode material for a lithium ion battery of Example 7 was used.

Example 8

An electrode material for a lithium ion battery of Example 8 was obtained in the same manner as in Example 1 except for the fact that, as organic compounds which served as raw materials of a carbonaceous film, 557.7 g of a polyvinyl alcohol aqueous solution, 89.1 g of sucrose powder, and 203.4 g of a phenolic resin solution, the solid content of which had been adjusted to 20% in advance, were dispersed in 5 kg (in terms of the solid content) of the electrode active material by carrying out a dispersion treatment for two hours in a bead mill using zirconia balls having a diameter of 1 mm as medium particles, thereby preparing a homogeneous slurry, thereby preparing a homogeneous slurry.

In addition, a lithium ion battery of Example 8 was obtained in the same manner as in Example 1 except for the fact that the electrode material for a lithium ion battery of Example 8 was used.

Example 9

An electrode material for a lithium ion battery of Example 9 was obtained in the same manner as in Example 1 except for the fact that water was added so that the solid content of the slurry reached 50% by mass.

In addition, a lithium ion battery of Example 9 was obtained in the same manner as in Example 1 except for the fact that the electrode material for a lithium ion battery of Example 9 was used.

Example 10

As a Li source and a P source, $Li_3PO_4$ and, as a Fe source, a $FeSO_4$ aqueous solution were used, these were mixed so that the molar ratio (Li:Fe:P) reached 3:1:1 to prepare 1,000 L of a raw material slurry, and the raw material slurry was put into a pressure resistant vessel. After that, the raw material slurry was heated and reacted at 190° C. for 2.0 hours. After this reaction, the raw material slurry was cooled to reach room temperature (25° C.), thereby obtaining a sedimented reaction product in a cake state. In addition, this sediment was sufficiently cleaned with distilled water a plurality of times, thereby obtaining a cake-form electrode active material.

Next, as organic compounds which served as raw materials of a carbonaceous film, 247.9 g of a polyvinyl alcohol aqueous solution, 39.6 g of sucrose powder, and 90.5 g of a phenolic resin solution, the solid content of which had been adjusted to 20% in advance, were dispersed in 5 kg (in terms of the solid content) of the electrode active material by carrying out a dispersion treatment for two hours in a bead mill using zirconia balls having a diameter of 1 mm as medium particles, thereby preparing a homogeneous slurry. After that, water was added to the slurry so that a solid content of the slurry reached 50% by mass.

Next, this slurry was sprayed in the atmosphere at 150° C. and dried, thereby obtaining granulated bodies of the electrode active material which had an average particle diameter of 9 μm and were coated with an organic substance.

A graphite sintered body having an average length in the longitudinal direction of 10 mm was added as a thermal conduction auxiliary substance to the granulated bodies so that the content thereof reached 5% by volume with respect to 100% by volume of the obtained granulated bodies, and the components were mixed together, thereby obtaining a calcination raw material. 2.5 kg of this calcination raw material was laid in a 10 L graphite capsule, was calcinated for 2.5 hours at 700° C. in a non-oxidative gas atmosphere, and was then retained at 40° C. for 30 minutes, thereby obtaining a calcinated substance. This calcinated substance was passed through a ϕ75 μm sieve, and the graphite sintered body was removed, thereby obtaining an electrode material for a lithium ion battery of Example 10.

In addition, a lithium ion battery of Example 10 was obtained in the same manner as in Example 1 except for the fact that the electrode material for a lithium ion battery of Example 10 was used.

Example 11

An electrode material for a lithium ion battery of Example 11 was obtained in the same manner as in Example except for the fact that the amount of the sucrose powder added was set to 19.8 g, and the amount of the phenolic resin solution added was set to 135.6 g.

In addition, a lithium ion battery of Example 11 was obtained in the same manner as in Example 1 except for the fact that the electrode material for a lithium ion battery of Example 11 was used.

Comparative Example 1

An electrode material for a lithium ion battery of Comparative Example 1 was obtained in the same manner as in Example 1 except for the fact that the amount of the sucrose powder added was set to 118.8 g, and the amount of the phenolic resin solution added was set to 0 g.

In addition, a lithium ion battery of Comparative Example 1 was obtained in the same manner as in Example 1 except for the fact that the electrode material for a lithium ion battery of Comparative Example 1 was used.

Comparative Example 2

An electrode material for a lithium ion battery of Comparative Example 2 was obtained in the same manner as in Example 1 except for the fact that water was added so that the solid content of the slurry reached 20% by mass.

In addition, a lithium ion battery of Comparative Example 2 was obtained in the same manner as in Example 1 except for the fact that the electrode material for a lithium ion battery of Comparative Example 2 was used.

Comparative Example 3

An electrode material for a lithium ion battery of Comparative Example 3 was obtained in the same manner as in Example 10 except for the fact the amount of the sucrose powder added was set to 79.2 g, and the amount of the phenolic resin solution added was set to 0 g.

In addition, a lithium ion battery of Comparative Example 3 was obtained in the same manner as in Example 10 except for the fact that the electrode material for a lithium ion battery of Comparative Example 3 was used.

The obtained electrode materials for a lithium ion battery were evaluated using the following methods. The results are shown in Table 1.

(1) Specific Surface Area

The specific surface area of the electrode material for a lithium ion battery was measured using a specific surface meter (for example, manufactured by Mountech Co., Ltd., product No.: Macsorb HM MODEL 1208).

(2) Content of Carbon

The content of carbon in the electrode material for a lithium ion battery was measured using a carbon analyzer (manufactured by Horiba Ltd., product No.: EMIA-220V).

(3) Content of Carbon Per Unit Specific Surface Area

The content of carbon per unit specific surface area in the electrode material for a lithium ion battery was obtained by dividing the content of carbon obtained in (2) by the specific surface area measured in (1).

(4) Tap Density

The tap density of the electrode material for a lithium ion battery was measured using a method according to test methods for bulk density of fine ceramic powder of JIS R 1628:1997.

(5) Micropore Volume

Nitrogen adsorption measurement was carried out using a nitrogen adsorption amount measurement instrument (manufactured by MicrotracBEL Corp., trade name: BEL-SORP-max). The micro pore volume of the electrode material for a lithium ion battery was obtained from a micropore adsorption amount of nitrogen in an adsorption isotherm by analyzing a measured nitrogen adsorption measurement result a pore size distribution in a range of micropore diameters of 0.7 nm or more and 2.0 nm or less, using an HK method and obtaining relative pressures corresponding to micropore diameters in the range of micropore diameters of 0.7 nm or more and 2.0 nm or less. Furthermore, as volumes of meso pores and macro pores in the electrode material for a lithium ion battery, a pore size distribution in a range of micropore diameters of 2.4 nm or more and 194 nm or less was analyzed using a BJH method, relative pressures corresponding to micropore diameters in the range of micropore diameters of 2.4 nm or more and 194 nm or less were obtained, and a volume of the micropores of 2.4 nm or more and 194 nm or less was obtained from a micropore adsorption amount of nitrogen in the adsorption isotherm.

(6) Volume Ratio of Micro Pores

The volume ratio of micro pores was calculated by considering a sum of micropore volumes of the micro pores, the meso pores, and macro pores obtained in (5) as a volume of all of pores and dividing a micro pore volume by the volume of all of pores.

(7) Metal Elution Amount 3 g of the electrode material was immersed in 30 g of an acidic aqueous solution of sulfuric acid (pH 4), left to stand at 25° C. for 24 hours, and then filtered so as to remove powder, thereby producing a liquid as a specimen. The specimen was turned to be acidic by sulfuric acid, and ICP measurement was carried out for Fe and Mn. In the ICP measurement, a high-frequency inductively coupling plasma emission spectrophotometer (manufactured by Hitach High-Tech Science Corporation, trade name: SPS3500DD) was used.

[Evaluation of Lithium Ion Batteries]

The obtained lithium ion batteries were evaluated using the following methods. The results are shown in Table 2.

(1) Discharge Capacity and Storage Capacity after High-Temperature Storage

A service life test of the lithium ion battery was carried out as described below.

First, as battery aging, constant current charging was carried out at an ambient temperature of 25° C. and a current value of 1 CA until a voltage of the cathode reached 4.3 V with respect to a balanced voltage of Li in Examples 1 to 9 and Comparative Examples 1 and 2 and the voltage of the cathode reached 4.2 V with respect to the balanced voltage of Li in Examples 10 and 11 and Comparative Example 3, after a predetermined voltage was reached, constant voltage charging was carried out until a current value reached 0.1 CA. After that, a one-minute rest was provided, and then 1CA constant current discharging was carried out at the ambient temperature of 25° C. until the voltage of the cathode reached 2.5 V with respect to the balanced voltage of Li. This operation was repeated three cycles, which was considered as aging.

After that, constant current charging was carried out at an ambient temperature of 60° C. and a current value of 1 CA until the voltage of the cathode reached 4.3 V with respect to the balanced voltage of Li in Examples 1 to 9 and Comparative Examples 1 and 2 and the voltage of the cathode reached 4.2 V with respect to the balanced voltage of Li in Examples 10 and 11 and Comparative Example 3, after a predetermined voltage was reached, constant voltage charging was carried out until the current value reached 0.1 CA. After that, a one-minute rest was provided, and then 1CA constant current discharging was carried out at the ambient temperature of 40° C. until the voltage of the cathode reached 2.5 V with respect to the balanced voltage of Li, and this value was considered as a discharge capacity in Table 2. Furthermore, constant current charging was carried out at an ambient temperature of 25° C. and a current value of 1 CA until the voltage of the cathode reached 4.3 V with respect to the balanced voltage of Li in Examples 1 to 9 and Comparative Examples 1 and 2 and the voltage of the cathode reached 4.2 V with respect to the balanced voltage of Li in Examples 10 and 11 and Comparative Example 3, after a predetermined voltage was reached, constant voltage charging was carried out until the current value reached 0.1 CA. After that, a two-week rest was provided, and then 1CA constant current discharging was carried out at the ambient temperature of 40° C. until the voltage of the cathode reached 2.5 V with respect to the balanced voltage of Li, and this discharge capacity value was considered as a storage capacity after high-temperature storage in Table 2.

TABLE 1

| | Hydrothermal temperature [° C.] | Solid content [% by mass] | Calcination temperature [° C.] | Electrode active material particles | Specific surface area [$m^2/g$] | content of carbon per unit specific surface area [$mg/m^2$] |
|---|---|---|---|---|---|---|
| Example 1 | 145 | 40 | 700 | $LiFe_{0.2448}Mn_{0.70}Mg_{0.05}Ca_{0.0002}Co_{0.005}PO_4$ | 21.1 | 1.09 |
| Example 2 | 145 | 40 | 700 | $LiFe_{0.2448}Mn_{0.70}Mg_{0.05}Ca_{0.0002}Co_{0.005}PO_4$ | 20.5 | 1.11 |
| Example 3 | 145 | 40 | 700 | $LiFe_{0.2448}Mn_{0.70}Mg_{0.05}Ca_{0.0002}Co_{0.005}PO_4$ | 19.8 | 1.18 |
| Example 4 | 145 | 40 | 700 | $LiFe_{0.2448}Mn_{0.70}Mg_{0.05}Ca_{0.0002}Co_{0.005}PO_4$ | 21.8 | 1.11 |
| Example 5 | 170 | 40 | 700 | $LiFe_{0.2448}Mn_{0.70}Mg_{0.05}Ca_{0.0002}Co_{0.005}PO_4$ | 13.7 | 1.67 |
| Example 6 | 120 | 40 | 700 | $LiFe_{0.2448}Mn_{0.70}Mg_{0.05}Ca_{0.0002}Co_{0.005}PO_4$ | 26.2 | 0.96 |
| Example 7 | 145 | 40 | 700 | $LiFe_{0.2448}Mn_{0.70}Mg_{0.05}Ca_{0.0002}Co_{0.005}PO_4$ | 20.8 | 0.61 |
| Example 8 | 145 | 40 | 700 | $LiFe_{0.2448}Mn_{0.70}Mg_{0.05}Ca_{0.0002}Co_{0.005}PO_4$ | 21.2 | 1.78 |
| Example 9 | 145 | 50 | 700 | $LiFe_{0.2448}Mn_{0.70}Mg_{0.05}Ca_{0.0002}Co_{0.005}PO_4$ | 20.4 | 1.23 |
| Example 10 | 190 | 50 | 700 | $LiFePO_4$ | 15.8 | 0.71 |
| Example 11 | 190 | 50 | 700 | $LiFePO_4$ | 15.6 | 0.74 |
| Comparative Example 1 | 145 | 40 | 700 | $LiFe_{0.2448}Mn_{0.70}Mg_{0.05}Ca_{0.0002}Co_{0.005}PO_4$ | 20.9 | 1.17 |
| Comparative Example 2 | 145 | 20 | 700 | $LiFe_{0.2448}Mn_{0.70}Mg_{0.05}Ca_{0.0002}Co_{0.005}PO_4$ | 21.8 | 1.10 |
| Comparative Example 3 | 190 | 50 | 700 | $LiFePO_4$ | 15.8 | 0.73 |

| | content of carbon [% by mass] | Tap density [$g/cm^3$] | Micropore volume [$cm^3/g$] Micropores | All of pores | Volume ratio of micropores [%] | Metal elution amount [ppm] Fe | Mn |
|---|---|---|---|---|---|---|---|
| Example 1 | 2.31 | 1.22 | 0.00339 | 0.157 | 2.16 | 2.0 | 6.3 |
| Example 2 | 2.28 | 1.25 | 0.00255 | 0.163 | 1.57 | 1.6 | 6.5 |
| Example 3 | 2.34 | 1.24 | 0.00273 | 0.154 | 1.77 | 1.7 | 6.1 |
| Example 4 | 2.41 | 1.19 | 0.00387 | 0.159 | 2.43 | 2.8 | 7.0 |
| Example 5 | 2.29 | 1.26 | 0.00314 | 0.150 | 2.09 | 1.7 | 4.6 |
| Example 6 | 2.52 | 1.12 | 0.00342 | 0.173 | 1.98 | 4.6 | 8.1 |
| Example 7 | 1.26 | 1.24 | 0.00317 | 0.149 | 2.13 | 4.4 | 7.6 |
| Example 8 | 3.78 | 1.14 | 0.00376 | 0.169 | 2.22 | 3.7 | 6.7 |
| Example 9 | 2.50 | 1.43 | 0.00317 | 0.152 | 2.08 | 3.5 | 4.0 |
| Example 10 | 1.12 | 1.31 | 0.00260 | 0.158 | 1.64 | 6.5 | — |
| Example 11 | 1.16 | 1.35 | 0.00328 | 0.152 | 2.15 | 8.2 | — |
| Comparative Example 1 | 2.45 | 1.19 | 0.00461 | 0.165 | 2.79 | 74.0 | 13.0 |
| Comparative Example 2 | 2.40 | 0.87 | 0.00321 | 0.158 | 2.04 | 14.6 | 10.5 |
| Comparative Example 3 | 1.16 | 1.32 | 0.00409 | 0.154 | 2.65 | 96.2 | — |

TABLE 2

| | Discharge capacity [mAh/g] | Storage capacity after high-temperature storage [mAh/g] |
|---|---|---|
| Example 1 | 152 | 129 |
| Example 2 | 143 | 116 |
| Example 3 | 148 | 118 |
| Example 4 | 156 | 115 |
| Example 5 | 145 | 121 |
| Example 6 | 152 | 117 |
| Example 7 | 148 | 113 |
| Example 8 | 149 | 108 |
| Example 9 | 144 | 116 |
| Example 10 | 158 | 125 |
| Example 11 | 155 | 122 |
| Comparative Example 1 | 151 | 74 |
| Comparative Example 2 | 154 | 93 |
| Comparative Example 3 | 153 | 92 |

(Summary of Results)

It is found that, in all of the electrode materials for a lithium ion battery of Examples 1 to 11 in which the tap density satisfied the range of 0.95 g/$cm^3$ or more and 1.6 g/$cm^3$ or less and the volume ratio of micro pores to the total volume that was evaluated from nitrogen adsorption measurement satisfied the range of 1.5% or more and 2.5% or less, the metal elution amount was decreased, the lithium ion batteries in which the electrode material for a lithium ion battery was used had a high discharge capacity, and a decrease in the storage capacity after high-temperature storage could be suppressed.

The electrode material for a lithium ion battery of the present invention is useful as a cathode of a lithium ion battery.

The invention claimed is:

1. An electrode material for a lithium ion battery, comprising:

electrode active material particles; and a carbonaceous film that coats surfaces of the electrode active material particles, wherein a tap density is 0.95 g/$cm^3$ or more and 1.26 g/$cm^3$ or less, and a volume ratio of micro pores to a total volume that is evaluated from nitrogen adsorption measurement is 1.5% or more and 2.5% or less, wherein the electrode active material particles are represented by General Formula $LiFe_{x2}Mn_{1-x2-y2}M_{y2}PO_4$ (here, M represents at least one element selected from the group consisting of Mg, Ca, Co, Sr, Ba, Ti, Zn, B, Al, Ga, In, Si, Ge, Sc, and Y, $0.05 \leq x2 \leq 1.0$, and $0 \leq y2 \leq 0.14$); and wherein a specific surface area of the electrode active material particles is 10 $m^2$/g or more and 28 $m^2$/g or less.

2. The electrode material for a lithium ion battery according to claim 1, wherein a content of carbon per unit specific surface area is 0.4 mg/$m^2$ or more and 2.0 mg/$m^2$ or less.

3. A lithium ion battery comprising:

a cathode;

an anode; and an electrolyte, wherein the cathode has a cathode mixture layer formed using the electrode material according to claim 1.

4. The electrode material of claim 1, wherein:

a carbon content of the electrode active material is 0.8% by mass or more to 4.0% by mass or less;

an average thickness of the carbonaceous film is 1.0 nm or more to 10.0 nm or less; and a coating ratio of the carbonaceous film is 60% or more.

* * * * *